(12) United States Patent
Gordon

(10) Patent No.: US 7,142,774 B2
(45) Date of Patent: Nov. 28, 2006

(54) SYSTEM AND METHOD FOR MESSAGE INSERTION WITHIN VIDEO RECORDINGS

(75) Inventor: Goren Gordon, Rishon Le-Zion (IL)

(73) Assignee: Gordonomics Ltd., Herzelia Pituah (IL)

( * ) Notice: Subject to any disclaimer, the term of this patent is extended or adjusted under 35 U.S.C. 154(b) by 1102 days.

(21) Appl. No.: 10/153,418

(22) Filed: May 21, 2002

(65) Prior Publication Data
US 2003/0095784 A1    May 22, 2003

(30) Foreign Application Priority Data
Nov. 20, 2001   (IL)   .................................. 146597
Nov. 21, 2001   (WO)   ...................... PCT/IL01/01074

(51) Int. Cl.
*H04N 5/91* (2006.01)
*H04N 7/00* (2006.01)

(52) U.S. Cl. ...................................................... 386/46

(58) Field of Classification Search ................... 386/1, 386/4, 45, 52, 54, 55, 64, 95, 101, 125; 360/13; 348/6–10, 390, 439; 369/53.12, 53.31, 53.44
See application file for complete search history.

(56) References Cited

U.S. PATENT DOCUMENTS 5,995,153 A  * 11/1999 Moeller et al. ......... 375/240.01
6,782,186 B1 *  8/2004 Covell et al. ................. 386/46

* cited by examiner

*Primary Examiner*—Thai Tran
*Assistant Examiner*—Mishawn Dunn
(74) *Attorney, Agent, or Firm*—Wolf, Greenfield & Sacks PC

(57) ABSTRACT

The present invention presents a method and system for insertion of messages within a video recording. The invention enables the insertion of messages (i.e., video messages such as commercials) within a video recording without overriding important segments within the video recording. Thus, the spectator is not interrupted while viewing the video recording. The method and system determine the unimportant segments within the video recording and organizes the messages to be inserted within a database. Accordingly, the plant device inserts the messages within the video recording. The output device presents the video recording with the inserted messages.

3 Claims, 1 Drawing Sheet

SYSTEM AND METHOD FOR MESSAGE INSERTION WITHIN VIDEO RECORDINGS

CROSS REFERENCE TO RELATED APPLICATIONS

This application claims priority from PCT Application No. PCT/IL01/01074, filed Nov. 21, 2001, and Israeli Patent Application No. 146597, filed Nov. 20, 2001, each of which is hereby incorporated by reference as if fully set forth herein.

BACKGROUND OF THE INVENTION

The present invention relates to a method and system for inserting messages within video recordings, in general, and to a method and system that provide insertion of recordings within existing video recordings minimizing the interruption of a viewer, in particular.

Video recordings are broadly used for leisure, education and many other uses. Video recordings provide a continuous changeable two-dimensional picture over the time axis. Video recording projection is performed on television sets as well as on computer screens. The growing market of TV broadcast on demand and the increase of viewers of movies by Internet, cable and satellite TV channels, etc. provides possibilities to transfer additional information to spectators. Due to the prohibition in most countries to implement deliberately subconscious advertisements and commercial messages the spectators must visualize the messages. Said additional information can be advertisements. Advertisements are added to movies by stopping the video recording (e.g., a movie) for broadcasting the advertisement. Commercial companies or government agencies that wish to forward their message, included within the advertisement come up against a mental obstacle regarding the spectator. The mental obstacle of spectators hinders the ability of the advertiser to forward the message to the spectators of the video recordings. Consequently, the content of the advertisement is forwarded only to a segment of the spectators of the video recording that receive only a fraction of a multifaceted message. The mental obstacle is derived from the distinct separation between the video recording and the transferred message (i.e., advertisement). A spectator decreases her or his reception concentration during the time interval designated for messages other than the observed video recording. Furthermore, only short and simple drawing attention messages are considered for broadcasting. Naturally, short and simple drawing attention messages limit the type of messages to be broadcasted. One way of confronting the requirements for broadcasting messages is by broadcasting "fast moving" messages easily viewed by spectators during the broadcast of video recording. The "fast moving" messages that broadcast messages concurrently to the broadcasting of the video recording conflicts with the spectators wish to view the entire broadcasted video recording. Undesirably, the "fast moving" messages override parts of the broadcasted picture, consequently, interrupts with the spectator's leisure, learning experience etc. Furthermore, said interruption for the inherent broadcasting permits "fast moving" messages to be extremely brief. Moreover, "fast moving" messages can create antagonism feeling towards the messages, which is a most undesirable result. There is therefore a need to facilitate a service that permits messages delivered within a video recording without having the substantial drawbacks of the prior art. Furthermore, there is a need to provide a service that will enable to forward messages that are multifaceted that are able to be received and implemented by spectators of video recordings. There is a further need to provide a service that enables broadcasting video messages within video recordings without over riding important segments of the broadcasted video recording.

There is therefore a need in the art for a method and system for message insertion within video recordings.

SUMMARY OF THE INVENTION

The present invention provides a method for insertion of messages within a video recording, the method comprising: receiving a message, and calculating complexity values of message received, and storing the message within a database, and receiving video recording, and calculating complexity values of received video recording, and inserting messages within video recording, and displaying video recording with inserted messages. The said received messages can be video messages.

The present invention presents a system for insertion of messages within video recording, the system comprises: an input device for receiving video recording and messages; a computing device for calculating complex values of received video recording and messages, an insertion computing device for inserting messages within the video recording, and a storage device for storing commercials.

DETAILED DESCRIPTION OF PREFERRED EMBODIMENTS

Figure 1:
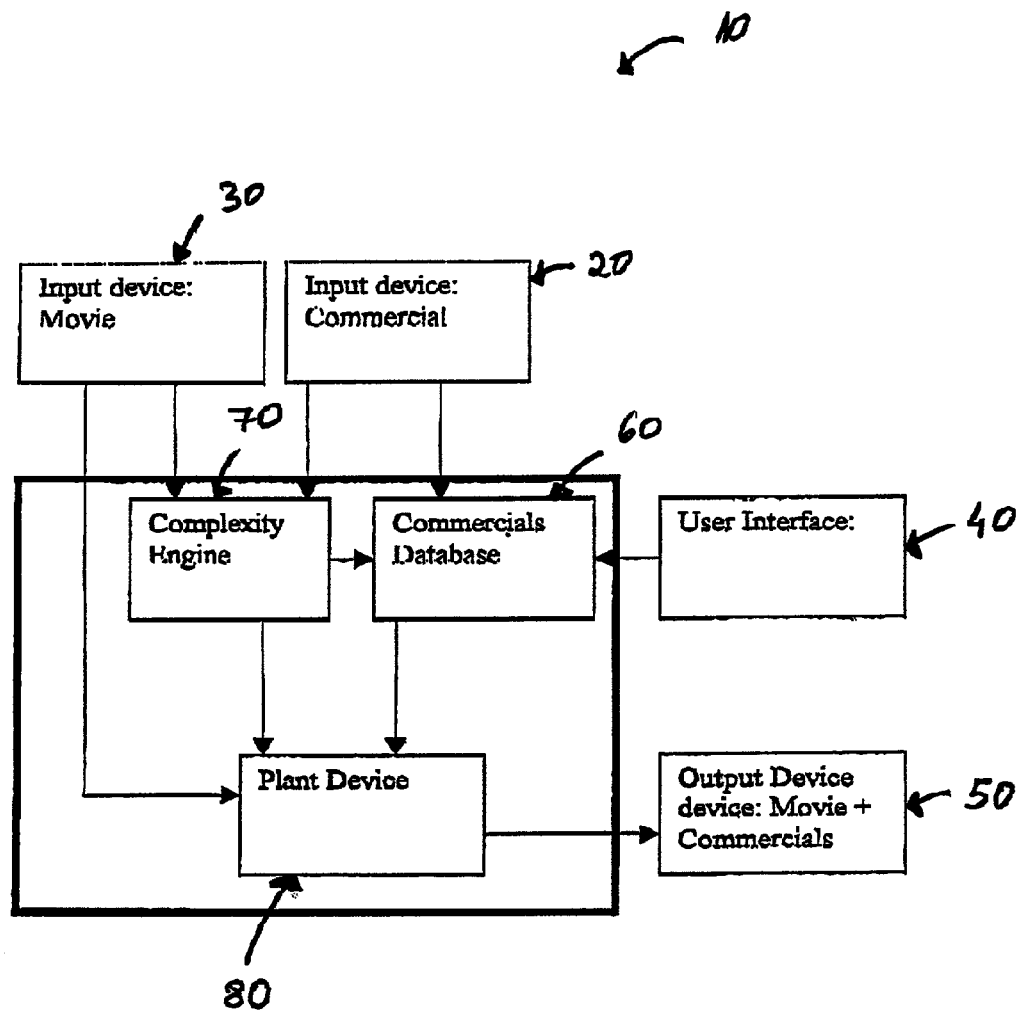
FIG. 1 illustrates a block diagram of a preferred embodiment of the present invention.

Preferred embodiments will now be described with reference to the drawings. For clarity of description, any element numeral in one figure will represent the same element if used in any other figure.

The present invention provides a method and system for message insertion within video recordings (SMI). The SMI provides the possibility of the insertion of messages to a video recording in a manner that does not over ride any important part segment of the broadcasted video recording. The present invention provides the use of the complexity data analysis (CDA) method and system presented within PCT Application PCT/IL01/01074, related patent application to the present invention, which is incorporated herein by reference. Thus, the present invention detects and analyzes video recordings activating the CDA method and system providing valuable information prior to insertion of video messages or other type of messages such as text or picture. The use of the CDA method and system for detecting and analyzing valuable information of video recordings is possible by exploiting a characteristic attribute of each video recording has, and the possibility of the SMI to calculate a complexity value of each video recording. The complexity characteristic attribute value of a video recording stored within the SMI or on-line video recording received as input enables to determine the important segments of the video picture and the less important segments of the picture. The CDA method and system used within the SMI provides complexity values to the video recordings and to the messages (i.e., video messages). The first step within the SMI is creating a video messages database (i.e., commercial advertisement database). The second step within the SIM is determining the unimportant segments within the video recording by calculating the complexity values of the recording. The high complexity value indicates the importance of the segment receiving the complexity value. A law complexity value provided to a segment of the video picture indicates the segment is not important thus, a video message, or any other message, can be inserted. The CDA calculates the complexity value by calculating a three-dimensional complexity value, including the picture and the time axis. The SIM determines the width and length dimensions as well as the time dimension of the unimportant segments within the video recording. Thus, the SIM determines the width and length dimensions as well as the time length of the inserted message possible. After adjusting performing the insertion by "planting" the video messages within the video recording the SIM presents the final result at the output device. The preferred embodiment of the present invention relates to the insertion of commercial advertisements within video recording (i.e., a movie). Thus, providing within the output device a movie with commercials. The SIM will be better understood relating to FIG. 1.

FIG. 1 depicts a block diagram illustrating the SIM, designated 10. The SIM 10 includes an input device 20 for the receiving of commercials, an input device 30 for the receiving of movies, a user interface 40, an output device 50, a complexity engine 70, a commercials database 60 and plant device 80. The input device 30 receives digital movies and the input device 20 receives commercials. At the first step the commercial database 60 is created. The commercials received from the input device 20 have their complexity calculated within the complexity engine 70. The commercials are stored within the commercial database 60 or within a separate database-storing device (not shown) with the complexity values calculated for the commercial. The commercial is then computed for other relevant parameters such as colors and other within the commercial database 60. The commercial database 60 determines the priority according to data received from internal database (not shown) within the SIM 10. The next step is the processing of the movie. The movie is received within the SIM 10 by the input device 30. The movie has its complexity values calculate within the complexity engine 70. Thus, the unimportant segments within the movie. The movie's complexity values are transferred to the plant device 80. The plant device 80 receives the parameters of the commercials required for insertion within the movie and executes the insertion in the appropriate locations. Thus, the commercials are inserted in accordance to the priority provided by the commercials database 60 and in accordance to thresholds determined by internal database (not shown) within the SIM 10. The said threshold determines the complexity not to be over ride by a commercial. A user at the user interface 40 can insert values to the internal database (not shown) that will provide threshold values for important complexity values within the movie, priority for commercials to be inserted as well as other values. The user interface 40 can include a pointing device a keyboard and the like, thus, providing a user with the ability to input said values to the SIM 10. The user interface 40 can include a screen for displaying the incoming commercials and movie. The plant device 80 computes all required values received from the commercial database 60 and the complexity engine 70 in order to place the commercials within the movie according to priority, law complexity values (unimportant segments) within the movie, colors contrast of said commercials with unimportant segments of movie etc. One skilled in the art can easily perceive that the above-preferred embodiment can be either on-line or off-line.

The person skilled in the art will appreciate that what has been shown is not limited to the description above. Those skilled in the art to which this invention pertains will appreciate many modifications and other embodiments of the invention. It will be apparent that the present invention is not limited to the specific embodiments disclosed and those modifications and other embodiments are intended to be included within the scope of the invention. Although specific terms are employed herein, they are used in a generic and descriptive sense only and not for purposes of limitation. The invention, therefore, is not to be restricted except in the spirit of the claims that follow.

What is claimed is:

1. A method for insertion of messages within a video recording, the method comprising:
   receiving a message;
   calculating complexity values of message received;
   storing the message within a database;
   receiving video recording;
   calculating complexity values of received video recording;
   inserting messages within video recording; and
   displaying video recording with inserted messages.

2. The method of claim 1 wherein the messages are video messages.

3. A system for insertion of messages within video recording, the system comprises:
   an input device for receiving video recording and messages;
   a computing device for calculating complex values of received video recording and messages;
   an insertion computing device for inserting messages within the video recording; and
   a storage device for storing messages.

* * * * *